(12) United States Patent
Döbber et al.

(10) Patent No.: US 11,236,796 B2
(45) Date of Patent: Feb. 1, 2022

(54) VIBRATION DAMPER AND CONNECTION ELEMENT FOR CONNECTING A SHOCK ABSORBER TUBE TO AN ADD-ON UNIT FOR VEHICLES

(71) Applicants: THYSSENKRUPP BILSTEIN GMBH, Ennepetal (DE); THYSSENKRUPP AG, Essen (DE)

(72) Inventors: Johannes Döbber, Münster (DE); Ole Götz, Braunschweig (DE); Klaus Schmidt, Odenthal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/323,214

(22) PCT Filed: Aug. 4, 2017

(86) PCT No.: PCT/EP2017/069791
§ 371 (c)(1),
(2) Date: Feb. 4, 2019

(87) PCT Pub. No.: WO2018/029100
PCT Pub. Date: Feb. 15, 2018

(65) Prior Publication Data
US 2019/0186582 A1    Jun. 20, 2019

(30) Foreign Application Priority Data
Aug. 8, 2016 (DE) ................. 10 2016 214 672.6

(51) Int. Cl.
*F16F 9/32* (2006.01)
(52) U.S. Cl.
CPC ...... *F16F 9/325* (2013.01); *F16F 2230/0005* (2013.01); *F16F 2230/32* (2013.01)

(58) Field of Classification Search
CPC . F16F 9/325; F16F 2230/32; F16F 2230/0005
See application file for complete search history.

(56) References Cited

U.S. PATENT DOCUMENTS 5,353,898 A * 10/1994 Handke .......... F16F 9/325
188/318
5,649,611 A    7/1997 Nakadate
(Continued)

FOREIGN PATENT DOCUMENTS

CN    106104065 A    11/2016
DE    198 22 648 A    12/1998
(Continued)

OTHER PUBLICATIONS

English Translation of International Search Report issued in PCT/EP2017/069791, dated Oct. 31, 2017.

*Primary Examiner* — Xuan Lan Nguyen
(74) *Attorney, Agent, or Firm* — thyssenkrupp North America, LLC

(57) ABSTRACT

A vibration damper for a chassis of a vehicle including a damper tube which is filled at least partially with damping liquid and in which a piston rod can be moved to and fro. A working piston is movable with the piston rod, by way of which working piston the interior space of the damper tube is divided into a piston rod-side working space and a working space which is remote from the piston rod. At least one additional attachment unit is connected to the damper tube in a fluid-tight manner by way of a throughflow element. The throughflow element is arranged on the damper tube in a direction which differs from the radial direction of the damper tube.

20 Claims, 4 Drawing Sheets

(56) References Cited

U.S. PATENT DOCUMENTS

| | | | | | |
|---|---|---|---|---|---|
| 5,988,332 | A | * | 11/1999 | Marzocchi | B60G 17/021 188/298 |
| 6,260,677 | B1 | * | 7/2001 | Hayakawa | B60G 15/00 188/274 |
| 6,321,888 | B1 | * | 11/2001 | Reybrouck | F16F 9/325 188/299.1 |
| 8,733,519 | B2 | * | 5/2014 | Ryan | F16F 9/065 188/266.6 |
| 8,857,582 | B2 | * | 10/2014 | Murakami | F16F 9/187 188/322.13 |
| 8,978,848 | B2 | * | 3/2015 | Teng | F16F 9/342 188/266 |
| 9,850,976 | B2 | * | 12/2017 | Schmidt | F16F 9/325 |
| 10,514,077 | B2 | * | 12/2019 | Zeissner | F16F 9/325 |
| 2006/0102440 | A1 | * | 5/2006 | Nygren | B25B 13/48 188/314 |
| 2010/0109277 | A1 | | 5/2010 | Furrer | |
| 2010/0116608 | A1 | | 5/2010 | Runkel | |
| 2011/0017559 | A1 | * | 1/2011 | Sintorn | B60G 13/08 188/314 |
| 2016/0223044 | A1 | * | 8/2016 | Lin | F16F 9/44 |
| 2017/0167562 | A1 | * | 6/2017 | King | F16F 9/446 |
| 2018/0216692 | A1 | * | 8/2018 | Coaplen | F16F 9/062 |

FOREIGN PATENT DOCUMENTS

| | | |
|---|---|---|
| DE | 10 2012 111 936 A | 6/2014 |
| DE | 10 2012 111 938 A | 6/2014 |
| DE | 10 2014 108 027 A | 12/2015 |
| EP | 2 112 401 A | 10/2009 |
| WO | 2006/065235 A | 6/2006 |
| WO | 2013/171388 A | 11/2013 |

\* cited by examiner

VIBRATION DAMPER AND CONNECTION ELEMENT FOR CONNECTING A SHOCK ABSORBER TUBE TO AN ADD-ON UNIT FOR VEHICLES

CROSS REFERENCE TO RELATED APPLICATIONS

This application is a U.S. National Stage Entry of International Patent Application Serial Number PCT/EP2017/069791, filed Aug. 4, 2017, which claims priority to German Patent Application No. DE 10 2016 214 672.6, filed Aug. 8, 2016, the entire contents of both of which are incorporated herein by reference.

FIELD

The present disclosure generally relates to a vibration damper and to a connecting element for connecting a shock absorber tube to an attachment unit for vehicles.

BACKGROUND

Vibration dampers are known in a multiplicity of embodiments in the prior art. The attachment of module tubes in an axially parallel manner to damper tubes of vibration dampers is known, it being necessary for the installation space required to this end to exist in the vehicle for a perpendicular orientation of this type of module tubes. No alternative module tube arrangements are known for vehicles which do not have the necessary installation space for arranging a module tube.

DE 10 2012 111 936 A1 has disclosed a vibration damper for a vehicle for the axially parallel attachment of an external module tube to a damper tube.

Thus a need exists to provide installation possibilities of the vibration damper in a constricted vehicle installation space. Furthermore, a fluid-tight attachment is made possible between the damper tube of the vibration damper and the attachment unit. In addition, the production of modules which can be connected in a fluid-tight manner to the damper tube is to possible in a simple way and is capable of being carried out in an uncomplicated way.

DETAILED DESCRIPTION

Figure 1:
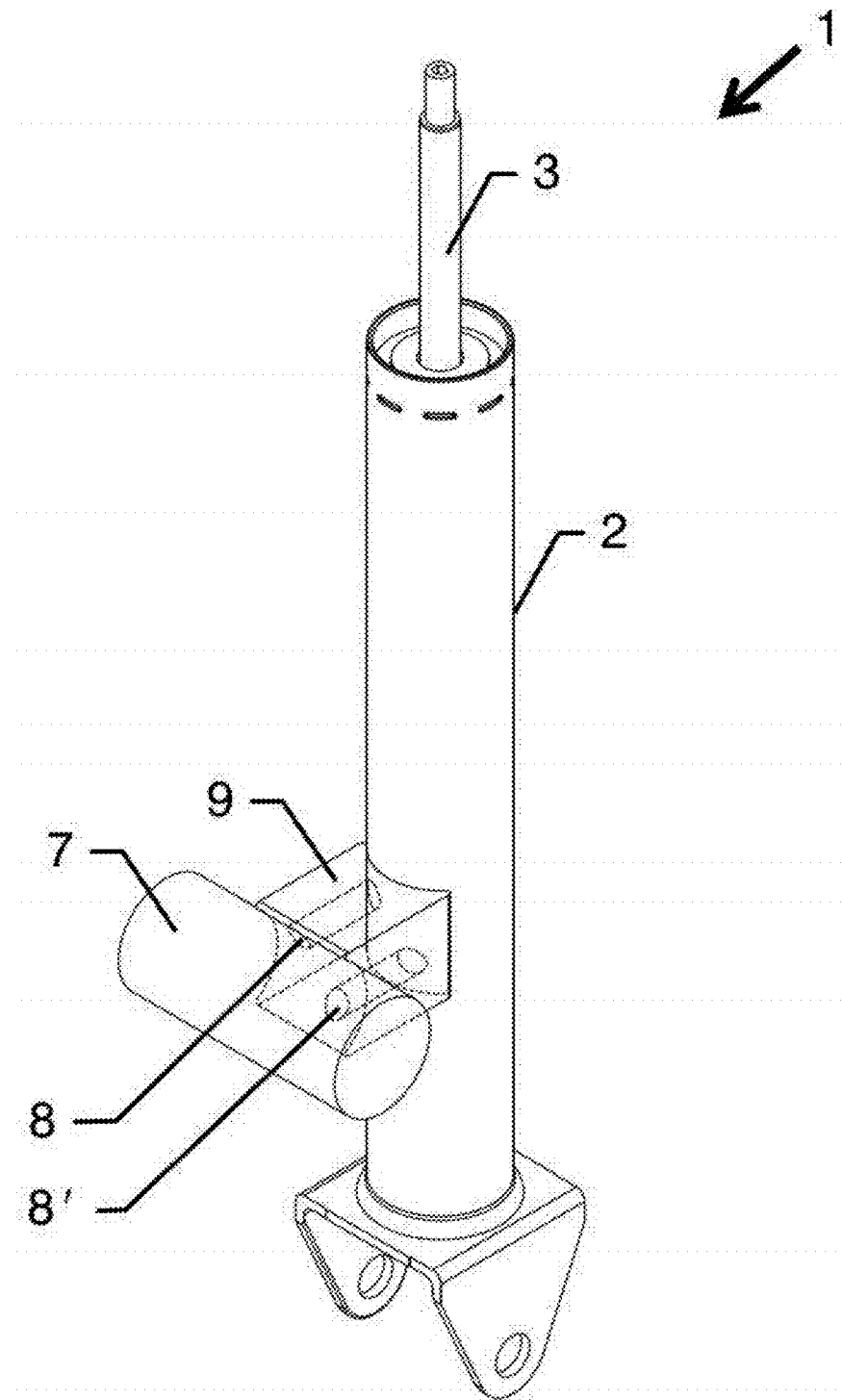
FIG. 1 is a perspective view of a vibration damper in accordance with one embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a vibration damper and to a connecting element for connecting a shock absorber tube to an attachment unit for vehicles.

In comparison with conventional vibration dampers, the vibration damper according to the invention has the advantage that an arrangement of attachment units, in particular module tubes, which differs from the axially parallel arrangement is also possible, in particular, for constricted installation spaces of vehicles. Furthermore, the production of modules which can be connected in a fluid-tight manner to the damper tube is possible in a simple way and can be carried out in an uncomplicated way. In addition, attachment units can be arranged on the damper tube of the vibration damper at different spacings and/or in a direction which differs from that direction which is axially parallel to the damper tube longitudinal axis.

The subject matter of the invention is therefore a vibration damper, in particular configured for a chassis of a vehicle, comprising a damper tube which is filled at least partially with damping liquid and in which a piston rod can be moved to and fro, it being possible for a working piston to also be moved with the piston rod, by way of which working piston the interior space of the damper tube is divided into a piston rod-side working space and a working space which is remote from the piston rod, further comprising at least one additional attachment unit, the at least one additional attachment unit being connected to the damper tube in a fluid-tight manner by way of at least one throughflow element, the at least one throughflow element being arranged on the damper tube in a direction which differs from the radial direction of the damper tube.

A further subject matter of the invention is a connecting element for connecting a damper tube in a fluid-tight manner to at least one additional attachment unit, comprising at least one throughflow element with at least two outlet sides, the connecting element having, on the at least two outlet sides of the at least one throughflow element from the connecting element, concave recesses for connecting the damper tube on a first outlet side and for connecting the at least one additional attachment unit on another outlet side, the concave recesses pointing in different directions.

Within the context of the present invention, an attachment unit is understood to mean a device which influences the damper action and is arranged on the damper tube of the vibration damper. In particular, an attachment unit can be a module tube, a pump apparatus, a gas tank, a measuring element, in particular a sensor, or a combination thereof.

Within the context of the present invention, a throughflow element is understood to mean an element which connects the damper tube of a vibration damper in a fluid-tight manner to the attachment unit of the vibration damper. A fluid can flow through the throughflow element between the damper tube of a vibration damper and the attachment unit of the vibration damper.

A throughflow element which is arranged on the damper tube can be flowed through with fluid from the damper tube via an opening which is arranged on the damper tube, in particular a hole, a bore, a perforated plate, a sleeve, a tube element or a combination thereof. The opening which is arranged on the damper tube can also be arranged in such a way that the opening opens onto the tube center axis of the damper tube.

Within the context of the present invention, fluids are understood to mean liquids and/or gases.

Within the context of the present invention, the radial direction is understood to mean any direction which extends in a rectilinear manner from a point on the center axis of a damper tube.

For example, a first throughflow element can be arranged on the damper tube in a direction which differs from the radial direction of the damper tube, in particular the first throughflow element is then not aligned with the center axis of the damper tube, and a further throughflow element can be arranged in the radial direction of the damper tube, in particular the further throughflow element is then aligned with the center axis of the damper tube.

For example, different directions are understood to mean opposed directions, directions which are arranged in a rotated manner with respect to one another, directions which are arranged in a shifted manner with respect to one another and combinations thereof. In particular, in order to connect the damper tube on the first outlet side and in order to connect the at least one additional attachment unit on another outlet side, the concave recesses have directions which are opposed to one another, and are arranged such that they are rotated at an angle of 90° with respect to one another.

Within the context of the present invention, outlet side is understood to mean a connector side of the at least one throughflow element. For example, a damper tube or an attachment unit can be connected on an outlet side of the connecting element.

In accordance with a further embodiment of the present invention, the at least one throughflow element is arranged in a direction which is not aligned with the center axis of the damper tube. In particular, the at least one throughflow element is arranged in such a way that the longitudinal axis of the throughflow element leads past the center axis of the damper tube. For example, the at least one throughflow element can be arranged in such a way that the longitudinal axis of the throughflow element is arranged at an acute or oblique angle in relation to the axial direction of the damper tube, and leads past the center axis of the damper tube.

In accordance with a further embodiment of the present invention, the at least one throughflow element is arranged at an angle of 90° in relation to the axial direction of the damper tube.

In accordance with a further embodiment of the present invention, at least two throughflow elements are arranged on the damper tube, the at least two throughflow elements being arranged on the damper tube in a direction which differs from the radial direction of the damper tube.

In one preferred embodiment of the present invention, the respective center points of the at least two throughflow elements are arranged on respective different cross-sectional planes of the damper tube in the axial direction of the damper tube. In particular, the at least two throughflow elements are arranged diagonally with respect to one another in the axial direction of the damper tube.

In accordance with a further preferred embodiment of the present invention, at least two throughflow elements are arranged on the damper tube, the at least two throughflow elements being arranged parallel to one another, in relation to the longitudinal axis of the damper tube.

In a further embodiment of the present invention, the at least two throughflow elements have different lengths.

In accordance with a further embodiment of the present invention, the at least one throughflow element is, in particular at least two throughflow elements are, arranged in at least one additional connecting element, in particular a connecting flange. In particular, the at least one additional connecting element can be selected from a carrier cage, in particular a metallic carrier cage, a plastic body, a three-dimensional structure or frame, or a combination thereof.

In accordance with a further embodiment of the present invention, the at least one throughflow element is connected to the at least one additional connecting element in an integrally joined, positively locking or non-positive manner. For example, the at least one throughflow element can be configured in the at least one additional connecting element, in particular can be produced from the at least one additional connecting element. For example, an additional connecting element can comprise at least one throughflow element and can be produced as a shaped part, in particular as an injection molded part. For example, the at least one throughflow element, in particular as a tube element, can also be surrounded by the at least one additional connecting element.

In a further embodiment of the present invention, at least two of the additional connecting elements are arranged parallel to one another in the damper tube longitudinal direction.

In accordance with a further embodiment of the present invention, the at least one additional attachment unit extends further beyond the center axis of the damper tube at one end than the other end of the one additional attachment unit. For example, this can be produced by way of the arrangement of the at least one additional attachment unit on the at least one throughflow element and/or by way of the geometric configuration of the at least one additional attachment unit.

In accordance with a further embodiment of the present invention, the at least one additional attachment unit is arranged in a direction which differs from the longitudinal axis of the damper tube.

In particular, the at least one additional attachment unit can be arranged in a direction which differs from that direction which is parallel to the longitudinal axis of the damper tube.

In a further embodiment of the present invention, the at least one additional attachment unit is arranged at an angle in the range from 10° to 90°, in relation to the longitudinal axis of the damper tube.

In one particularly preferred embodiment of the present invention, the at least one additional attachment unit is arranged at an angle of 90° in relation to the longitudinal axis of the damper tube.

In accordance with a further embodiment of the present invention, the at least one throughflow element is arranged in the connecting element in a direction which differs from the center axis in the throughflow direction of the connecting element.

FIG. 1 diagrammatically shows a three-dimensional oblique view of a vibration damper 1 comprising a damper tube 2, a piston rod 3, a connecting rod 9 and an attachment unit 7. Throughflow elements 8, 8' (shown using dashed lines) are arranged in the connecting element 9, the damper tube 2 being connected in a fluid-tight manner to the attachment unit 7 by way of the throughflow elements 8, 8'. The throughflow elements 8, 8' which are shown are arranged diagonally. The attachment unit 7 is shown at an angle of 90° in relation to the damper tube longitudinal direction.

Figure 2:
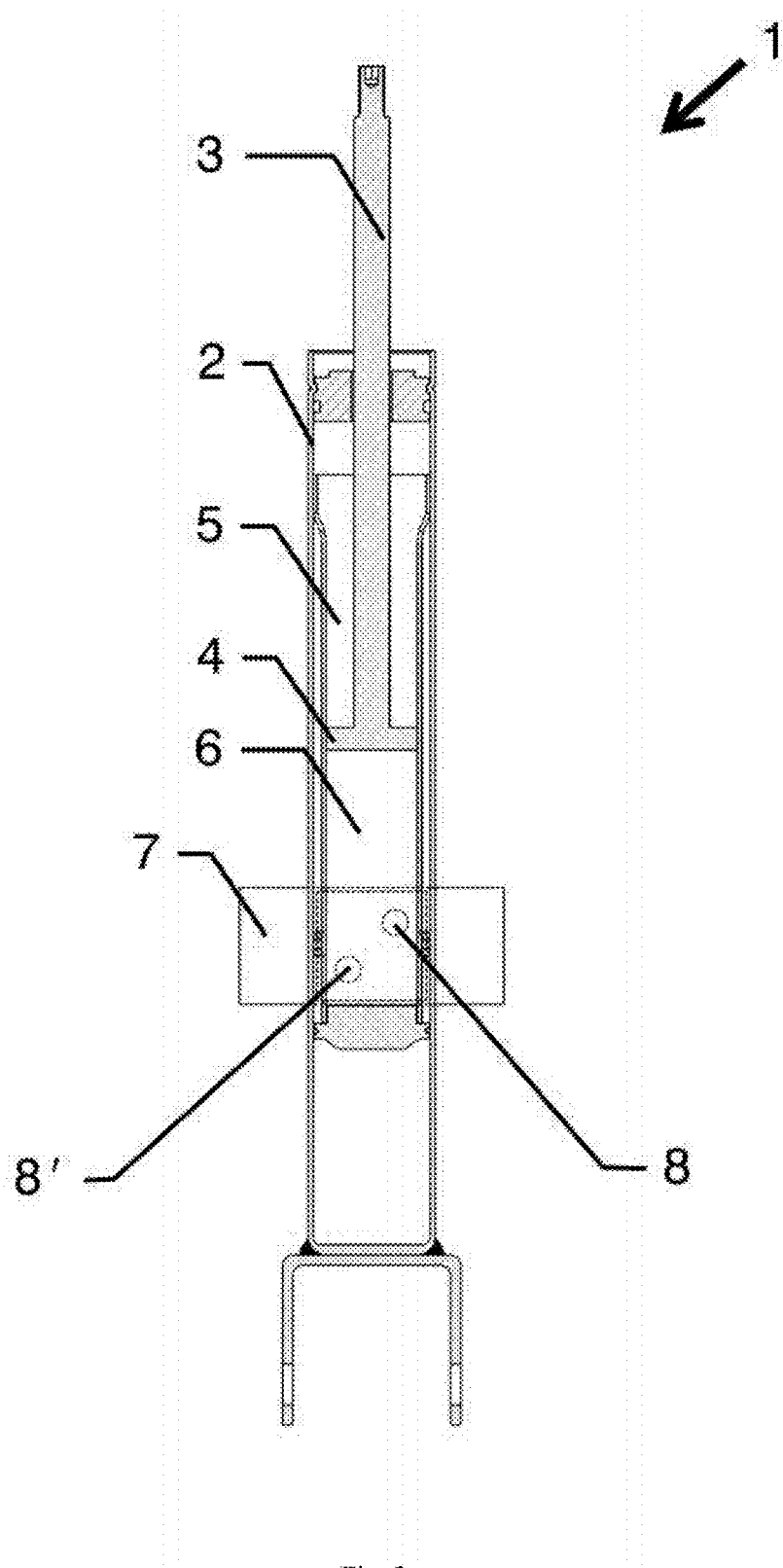
FIG. 2 is a longitudinal sectional view of the vibration damper according to FIG. 1.

FIG. 2 shows by way of example a diagrammatic longitudinal section of the vibration damper 1 according to FIG. 1. At that end of the piston rod 3 which protrudes into the damper tube 2, a working piston 4 which is arranged thereon is shown. The working piston 4 divides the interior space of the damper tube 2 into a piston rod-side working space 5 and a working space 6 which is remote from the piston rod. The throughflow elements 8, 8' which are shown in a dashed manner are arranged diagonally and have the same length. The attachment unit 7 is shown at an angle of 90° in relation to the longitudinal direction of the damper tube 2.

Figure 3:
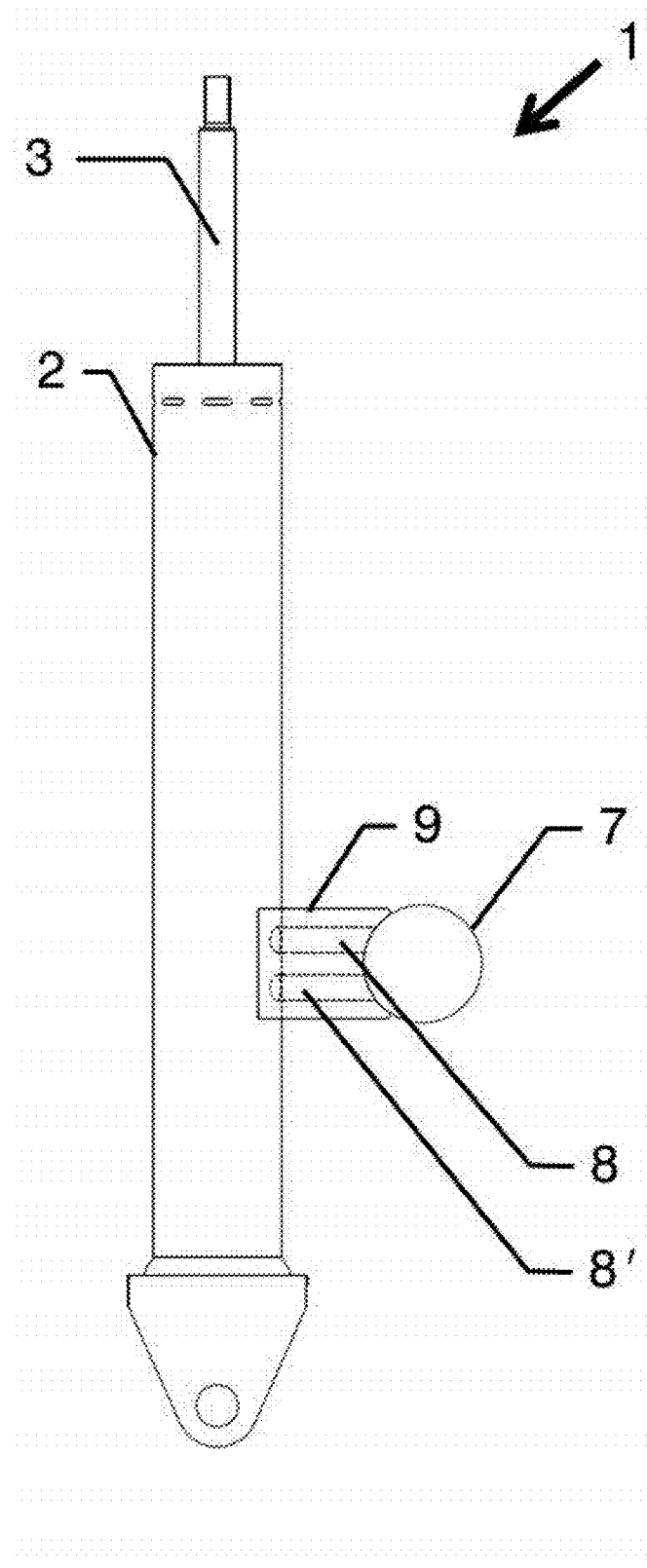
FIG. 3 is a side view of the vibration damper according to FIG. 1.

FIG. 3 diagrammatically shows a side view of the vibration damper 1 according to FIG. 1. The piston rod 3 is shown such that it protrudes into the damper tube 2 of the vibration damper 1. The throughflow elements 8, 8' which are shown in a dashed manner and connect the attachment unit 7 in a fluid-tight manner to the damper tube 2 are arranged on the damper tube 2. The throughflow elements 8, 8' are shown in a manner which is arranged at a 90° angle with respect to the longitudinal axis of the damper tube 2. The connecting element 9 which is shown comprises the throughflow elements 8, 8' and reaches, for example, from the damper tube 2 to the attachment unit 7.

Figure 4:
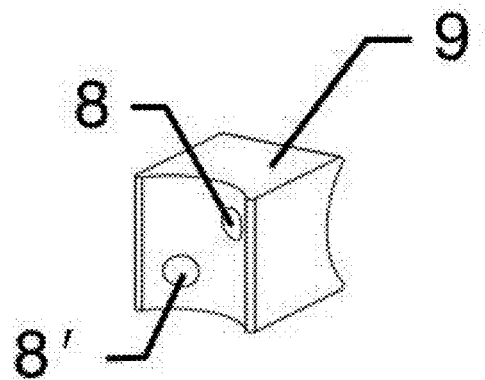
FIG. 4 is a perspective view of the connecting element of the vibration damper according to FIG. 1.

FIG. 4 diagrammatically shows a view of the connecting element 9 of the vibration damper 1 according to FIG. 1. As shown, the throughflow elements 8, 8' run through the connecting element 9. The respective ends of the connecting element 9 for attaching the damper tube 2 on one side and the attachment unit 7 on the other side to the connecting element 9 are shown in each case as concave recesses. As results from the concave recesses which are shown, the attachment unit 7 can be arranged at an angle of 90° in relation to the damper tube 2.

Figure 5:
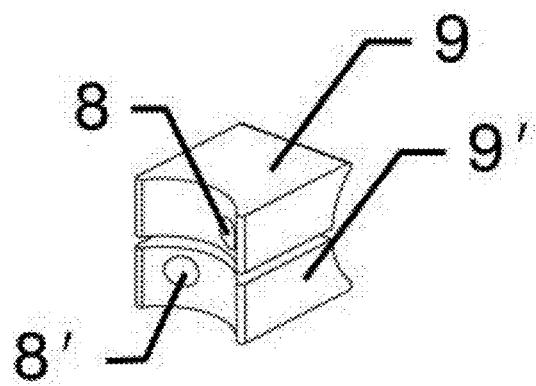
FIG. 5 is a perspective view of connecting elements in accordance with one embodiment.

FIG. 5 diagrammatically shows a view of connecting elements 9, 9'. Each of the connecting elements 9, 9' has a throughflow element 8, 8'. The connecting elements 9, 9' are of modular construction and are shown arranged above one another.

INDUSTRIAL APPLICABILITY

Vibration dampers of the above-described type are used in the production of damping systems, in particular in the case of vibration dampers of motor vehicles.

LIST OF DESIGNATIONS

1=Vibration damper
2=Damper tube
3=Piston rod
4=Working piston
5=Piston rod-side working space
6=Working space which is remote from the piston rod
7=Attachment unit
8, 8'=Throughflow element/elements
9, 9'=Connecting element/elements

What is claimed is:
1. A vibration damper for a chassis of a vehicle, the vibration damper comprising:
a damper tube defining an interior space which is filled at least partially with damping liquid and having a damper tube axis;
a piston rod movably disposed in the damper tube;
a working piston connected to the piston rod, the working piston movably disposed in the damper tube and dividing the interior space of the damper tube into a piston rod-side working space and a working space which is remote from the piston rod;
an attachment unit connected to the damper tube, the attachment unit having an attachment unit axis; and
a connecting element disposed between the damper tube and the attachment unit, the connecting element including a first outlet side with a first rectangular concave surface in contact with the damper tube, and a second outlet side with a second rectangular concave surface configured to contact the attachment unit and position the attachment unit spaced apart from the damper tube and position the attachment unit axis normal to the damper tube axis,
wherein the connecting element includes throughflow conduits extending from the first rectangular concave surface to the second rectangular concave surface and configured to permit fluid flow to and from the interior space and the attachment unit, the throughflow conduits having an orientation non-aligned with a radial direction of the damper tube, a first one of the throughflow conduits being disposed at a different longitudinal position along the damper tube axis relative to a second one of the throughflow conduits.

2. The vibration damper of claim 1, wherein the throughflow conduits are arranged at an angle of 90° in relation to an axial direction of the damper tube.

3. The vibration damper of claim 1, wherein the throughflow conduits are arranged parallel to one another.

4. The vibration damper of claim 1, wherein the throughflow conduits are formed through the connecting element.

5. The vibration damper of claim 4, wherein the connecting element is a connecting flange.

6. A connecting element for connecting a damper tube in a fluid-tight manner to an attachment unit, the connecting element comprising a first outlet side with a first rectangular concave surface configured to sealingly contact the damper tube, and a second outlet side with a second rectangular concave surface configured to sealingly contact the attachment unit and position the attachment unit spaced apart from the damper tube and position an attachment unit axis normal to a damper tube axis, and
throughflow conduits extending from the first rectangular concave surface to the second rectangular surface and configured to permit fluid flow to and from the damper tube and the attachment unit, the throughflow conduits having an orientation non-aligned with a radial direction of the damper tube, a first one of the throughflow conduits being disposed at a different longitudinal position along the damper tube axis relative to a second one of the throughflow conduits.

7. The connecting element of claim 6 wherein the first and second outlet sides of the connecting element between which the throughflow conduits extend are external sides of the connecting element.

8. The connecting element of claim 7 wherein the throughflow conduits extend linearly between the first and second outlet sides.

9. The vibration damper of claim 1 wherein via the throughflow conduits the attachment unit is in fluid communication with the piston rod-side working space or the working space that is remote from the piston rod.

10. The vibration damper of claim 1 wherein the attachment unit and the connecting element are disposed on an outer circumferential surface of the damper tube between a top and a bottom of the damper tube.

11. The vibration damper of claim 1 wherein the connecting element is disposed directly on an outer circumferential surface of the damper tube between a top and a bottom of the damper tube.

12. The vibration damper of claim 1 wherein the attachment unit is rigidly attached to the damper tube via the connecting element.

13. The vibration damper of claim 1 wherein the throughflow conduits in the connecting element extend from an elongated, curved side of the damper tube and have a non-parallel orientation relative to the damper tube axis along which the damper tube extends.

14. The connecting element of claim 6 wherein the throughflow conduits are configured to extend from an elongated, curved side of the damper tube and are configured to have a non-parallel orientation relative to the damper tube axis along which the damper tube extends.

15. The vibration damper of claim 1 wherein the throughflow conduits have the orientation that is non-aligned with the radial direction of the damper tube as the throughflow conduits are positioned to extend from a curved outer side of the damper tube.

16. The connecting element of claim 6 wherein the throughflow conduits are configured to have the orientation that is non-aligned with the radial direction of the damper tube when the throughflow conduits are positioned to extend from a curved outer side of the damper tube.

17. The vibration damper of claim 1 wherein the damper tube axis extends along a first plane that passes through a volumetric center of the connecting element, wherein a second plane passes through the volumetric center of the connecting element and is normal to the first plane, wherein the throughflow conduits that extend from an elongated, curved side of the damper tube are disposed at portions of the connecting element outside the first and second planes.

18. The connecting element of claim 6 wherein the damper tube axis extends along a first plane that is configured to pass through a volumetric center of the connecting element, wherein a second plane passes through the volumetric center of the connecting element and is normal to the first plane, wherein the throughflow conduits are configured to extend from an elongated, curved side of the damper tube and are disposed at portions of the connecting element outside the first and second planes.

19. The vibration damper of claim 1 wherein a first of the throughflow conduits extends along and is centered about a first axis, wherein a second of the throughflow conduits extends along and is centered about a second axis, wherein a third axis passes through a point on the first axis and a point on the second axis, with the points on the first and second axes through which the third axis passes being equidistant from the damper tube, wherein the third axis is oblique to the damper tube axis.

20. The connecting element of claim 6 wherein a first of the throughflow conduits extends along and is centered about a first axis, wherein a second of the throughflow conduits extends along and is centered about a second axis, wherein a third axis passes through a point on the first axis and a point on the second axis, with the points on the first and second axes through which the third axis passes being configured to be equidistant from the damper tube, wherein the third axis is configured to be oblique to the damper tube axis.

* * * * *